(12) United States Patent  (10) Patent No.: US 8,489,079 B2
Hintermeister et al.  (45) Date of Patent: Jul. 16, 2013

(54) CONTENT IDENTIFICATION AND RETRIEVAL BASED ON DEVICE COMPONENT PROXIMITY

(75) Inventors: Gregory R. Hintermeister, Rochester, MN (US); Timothy J. O'Keefe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/749,273

(22) Filed: Mar. 29, 2010

(65) Prior Publication Data

US 2011/0235577 A1 Sep. 29, 2011

(51) Int. Cl.
*H04M 3/42* (2006.01)

(52) U.S. Cl.
USPC ........................................ 455/414.2; 370/338

(58) Field of Classification Search
USPC ........................................ 455/414.2; 370/338
See application file for complete search history.

(56) References Cited

U.S. PATENT DOCUMENTS

| | | | |
|---|---|---|---|
| 6,624,843 B2 | 9/2003 | Lennon | |
| 7,203,911 B2 | 4/2007 | Williams | |
| 2002/0128923 A1 | 9/2002 | Dale | |
| 2005/0035852 A1* | 2/2005 | Paulsen | 340/438 |
| 2007/0224937 A1* | 9/2007 | Jung et al. | 455/41.2 |
| 2007/0224939 A1 | 9/2007 | Jung et al. | |
| 2008/0015931 A1 | 1/2008 | Smoler | |
| 2008/0113658 A1* | 5/2008 | Bloebaum et al. | 455/418 |
| 2008/0240579 A1* | 10/2008 | Enomoto | 382/224 |
| 2008/0243626 A1 | 10/2008 | Stawar et al. | |
| 2009/0187670 A1* | 7/2009 | Lee | 709/231 |
| 2009/0265055 A1* | 10/2009 | Gillies | 701/29 |
| 2010/0134269 A1* | 6/2010 | Zhu et al. | 340/447 |
| 2010/0141446 A1* | 6/2010 | Horn et al. | 340/572.1 |

* cited by examiner

*Primary Examiner* — Marcos Batista

(74) *Attorney, Agent, or Firm* — Kenneth L. Sherman, Esq.; Michael Zarrabian, Esq.; Sherman & Zarrabian LLP

(57) ABSTRACT

The invention provides proximity based content retrieval. A proximity element is provided for each of a plurality of components associated with a primary device. Identification information of each proximity element for an associated particular proximity space is communicated to a mobile wireless device. Upon the mobile wireless device being located within the associated particular proximity space of a particular proximity element, the mobile device receives associated identification information of the particular proximity element. The mobile device retrieves video content based on the associated identification information.

23 Claims, 7 Drawing Sheets

CONTENT IDENTIFICATION AND RETRIEVAL BASED ON DEVICE COMPONENT PROXIMITY

BACKGROUND OF THE INVENTION

1. Field of the Invention

The present invention relates generally to content retrieval and in particular to using device component proximity for retrieving related content.

2. Background Information

Finding relevant video content to watch for particular needs, such as training to use a device, is a complex task. Recently, certain video content can be found through searching the Internet via a browser. Most search methods, however, can return a plethora of search results, many of which are not pertinent. As a result, the time required for an individual to search and find desired video content related to a device is often extensive.

Further, typically the location where an individual can watch found video content is inconvenient and not co-located with the device.

BRIEF SUMMARY OF THE INVENTION

Embodiments of the invention provide content retrieval based on device component proximity. One embodiment comprises a system including a primary device having a plurality of components each including a proximity element. The system further includes a mobile device configured to receive identification information from a particular component among the plurality of components based on proximity of the mobile device to the particular component. The mobile device is further configured to retrieve content based on the received identification information.

In another embodiment of the invention, a method comprises providing a proximity element for each of a plurality of components associated with a primary device. The method further includes communicating identification information of each proximity element for an associated particular proximity space. In the method, upon a mobile wireless device being located within the associated particular proximity space of a particular proximity element, associated identification information of the particular proximity element is received, and content is retrieved based on the associated identification information.

In yet another embodiment of the invention, a computer program product for proximity based content retrieval comprising a computer usable medium including a computer readable program, wherein the computer readable program when executed on a computer causes the computer to receive identification information from a proximity element of a primary device component based on a particular proximity space associated with the proximity element. The computer further causes the computer to receive associated identification information from the proximity element, retrieve content based on the associated identification information, and to provide the content on a wireless mobile device.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
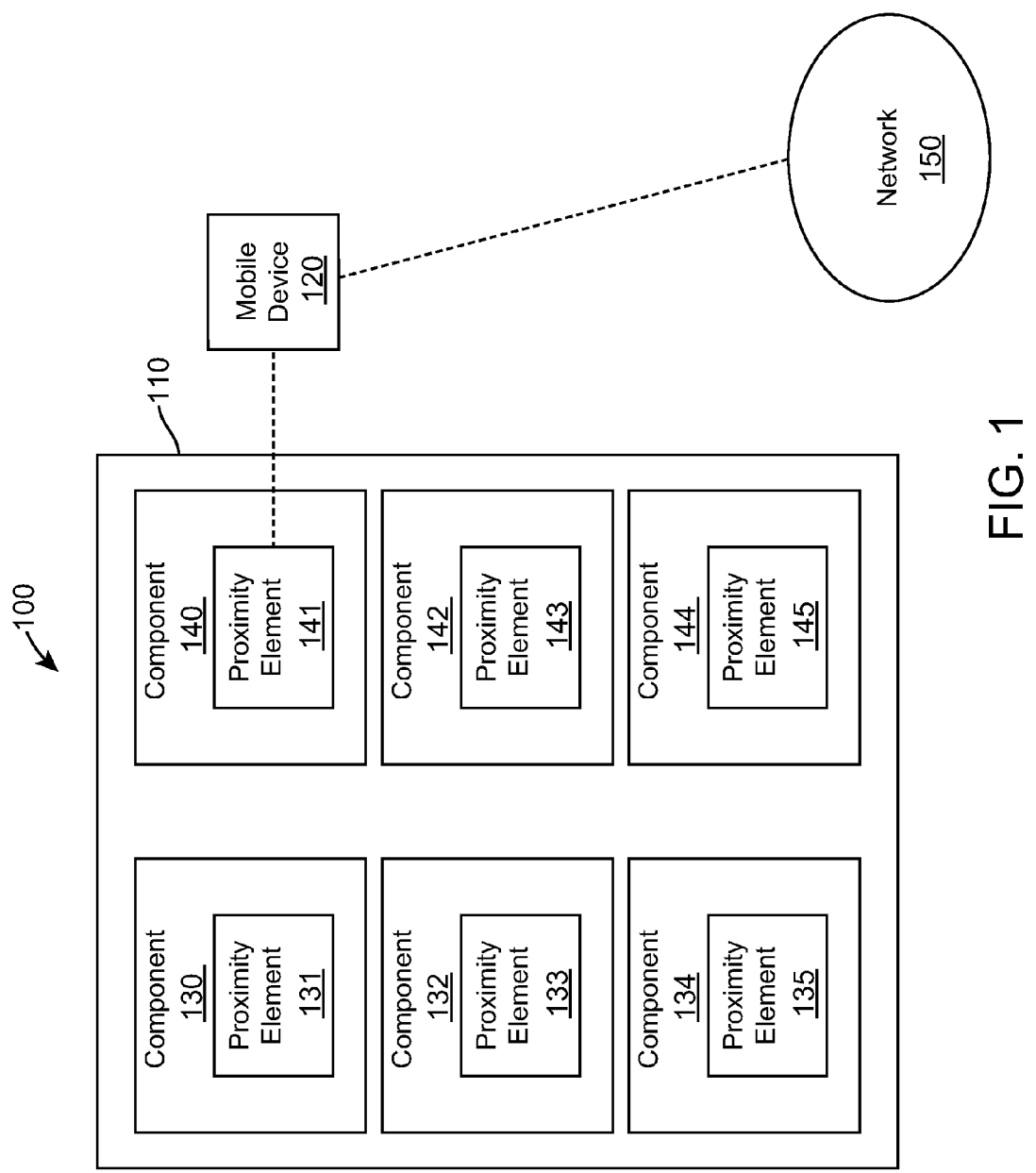
FIG. 1 illustrates a system according to one embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for proximity based content retrieval, as well as operation and/or component parts thereof. While the following description will be described in terms of proximity based content retrieval systems and processes for clarity and placing the invention in context, it should be kept in mind that the teachings herein may have broad application to all types of systems, devices and applications.

Embodiments of the invention automatically retrieve content (where content comprises video content, graphic content, audio content and text content, in any singular or combination of content type) for providing (e.g., displayed, shown, played, etc.) to a wireless mobile device based on proximity of a wireless mobile device to a particular component of a primary device. With these embodiments of the invention, particular content is provided to the wireless mobile device within a proximity space of a component of a primary device. In one example, the wireless mobile device is determined to be within a proximity space based on wireless technology, such as Bluetooth®, RFID, etc. In one embodiment of the invention, the proximity space of a component is within a predetermined sensed (e.g., distance or radius, such as 1-5 ft. distance and/or radius, 5-10 ft. distance and/or radius, etc. The content retrieved can include content related to use of the component, repair of the component, information regarding the component, maintenance information regarding the component, etc. Additionally, access can be controlled to information associated with the components. The embodiments save time and simplify retrieving information and video content by retrieving particular content while in the proximity of a specific component of a primary device.

In one example, the primary device is a device in a data center, such as a memory device storage system, server devices, cooling devices, telecommunication devices, etc. For example where the primary device is a memory device storage system, each component (e.g., a physical memory device) has a proximity space of 1 ft. distance and/or radius.

As a user moves a wireless mobile device, such as a cell phone, within a proximity space of a first memory device, content is automatically, retrieved, streamed, played, shown, etc., on the wireless mobile device, where the content is related to the first memory device. In one example, the content is related replacing the memory device, informing the user of the wireless mobile device information regarding the memory device (e.g., maintenance requirements), etc. In another example, the user of the wireless mobile device moves away from the proximity space of the first memory device, and enters the proximity space of a second memory device. While the wireless mobile device is within the proximity space of the second memory, content is retrieved, streamed, played, shown, etc., on the wireless mobile device that is related to the second memory device. In this example, the content can be related to the particular position or slot of the memory device, specific/general maintenance requirements, replacement instructions, statistical information (e.g., service dates, maintenance dates, error reports, problem reports, etc.).

One embodiment of the invention provides content retrieval based on component proximity. One implementation comprises a system having a device including components each including a proximity element. A mobile device is configured to receive identification information from a particular component based on proximity of the mobile device to the particular component. The mobile device is further configured to retrieve content based on the received identification information.

FIG. 1 illustrates an implementation of a content retrieval system comprising a component proximity based content retrieval system 100, according to one embodiment of the invention. The component proximity based content retrieval system 100 includes a primary device 110 and a mobile device 120. In one example the primary device 110 can comprise a physical device, such as computer network system devices, server devices, vehicles, electronic devices, mechanical devices, etc. In one or more embodiments of the invention the primary device 110 comprises components 130, 132, 134, 140, 142 and 144. It should be noted that other embodiments of the invention include other number of components based on the complexity of the primary device, replaceable components, information available about components, etc. The component proximity based content retrieval system 100 provides automatic retrieval of content based on proximity of the mobile device 120 to a component 130, 132, 134, 140, 142, 144. In one example, a component 130, 132, 134, 140, 142, 144 can be any component of a networked computer system physical device. In this example, a component can be a disk drive, server, switching device, cooling fan, client device, memory device, keyboard, monitor, pointing device, etc.

In one embodiment of the invention, the mobile device 120 is a wireless communication device, such as a cell phone, smart phone, a personal digital assistant (PDA), a portable wireless computer device (e.g., notebook, laptop, tablet, pad), etc. In this embodiment of the invention, the mobile device 120 includes a display device for displaying retrieved video, text and graphic content. In this embodiment of the invention, the mobile device can also include a speaker device for playing audio content.

In one embodiment of the invention, content is retrieved from the mobile device 120 itself. In this embodiment of the invention, the content known to be desired in a particular content category is stored in a memory device connected with the mobile device 120 (e.g., internal memory, external memory, etc.). In one example, the content category is associated with repair information of the components 130, 132, 134, 140, 142, 144 of a primary device 110. In other examples, the content category includes one or more of maintenance information, component use information, technical information, statistical information, etc. In one example, the mobile device 120 is connected to one or more of the following types of machine-readable memories: semiconductor firmware memory, programmable memory, non-volatile memory, read only memory, electrically programmable memory, random access memory, flash memory, magnetic disk memory, and/or optical disk memory, memory device arrays, virtual memory space using a memory device, etc. Either additionally or alternatively, the mobile device 120 may comprise other and/or later-developed types of computer-readable memory.

In another embodiment of the invention, content is retrieved from a wireless network 150. In one example the network 150 is a Wireless Local Area Network (WLAN). In another example the network 150 is the Internet. In these embodiments of the invention, the wireless mobile device 120 receives the content through known wireless technologies, such as cellular technologies, such as digital mobile communication (e.g., 2 G), wideband (e.g., 3 G), broadband (e.g., 4 G), etc., WI-FI (e.g., IEEE 802.11 technology), etc.

In one embodiment of the invention, as the wireless mobile device 120 moves around the component proximity based content retrieval system 100, content is provided to the wireless mobile device 120 that is related to the component (e.g., components 130, 132, 134, 140, 142, and 144) that the wireless mobile device 120 is within the proximity space of the proximity element (e.g., proximity elements 131, 133, 135, 141, 143, and 145) of a component (e.g., components 130, 132, 134, 140, 142, and 144). For example, if the primary device 110 is a car, the components (e.g., components 130, 132, 134, 140, 142, and 144) could be an alternator, a radiator, a battery, an air cleaner, etc. As a user holding a wireless mobile device 120, such as a cell phone, moves around the car, when the cell phone is within a proximity space of one of the components, content, such as a streaming video, is played on the cell phone, where the content is related to the component. In one example, when the user moves to the proximity of the air cleaner of the car, the cell phone plays a video related to replacing the air cleaner.

In another embodiment of the invention, as the wireless mobile device 120 is moved around the component proximity based content retrieval system 100, a split screen display appears on the wireless mobile device 120, where one portion of the display screen shows video/graphic/text content related to where the wireless mobile device 120 was first within the proximity space of a first proximity element (e.g., proximity elements 131, 133, 135, 141, 143, and 145) of a first component (e.g., components 130, 132, 134, 140, 142, and 144), and the other portion of the display screen shows at least an image (e.g., one or more video content frames, a graphic frame, a text frame, etc.) of content related to where the wireless mobile device 120 is headed or within the proximity space of a second proximity element (e.g., proximity elements 131, 133, 135, 141, 143, and 145) of a second component (e.g., components 130, 132, 134, 140, 142, and 144). For example, when a user holding the wireless mobile device 120, such as a PDA, moves around a primary device 110, such as a server rack including multiple servers, based on the proximity of a first server, the PDA would display a first view of content related to the first server. When the PDA is moved away from the first server into the proximity of a second server, the display of the PDA would show a split screen display with content related to the second server on one side of the display and content related to the first server on another side of the display.

In yet another embodiment of the invention, upon multiple content availability based on the wireless mobile device 120 being located within proximity to multiple proximity spaces of proximity elements (e.g., proximity elements 131, 133, 135, 141, 143, and 145) of components (e.g., components 130, 132, 134, 140, 142, and 144), the content related to the closest component (e.g., components 130, 132, 134, 140, 142, and 144) is provided to the wireless mobile device 120 while the other contents are shown as potential content by icons, names, small video/image frames, etc. In one example, the potential content is shown to the left or right, top or bottom of the displayed content for the closest component (e.g., components 130, 132, 134, 140, 142, and 144) that the wireless mobile device is within the proximity space. In another example, the display arranges icons, names, small video/image frames, etc., based on position of components (e.g., components 130, 132, 134, 140, 142, and 144), position of the wireless mobile device 120 in relation to the proximity space of the components, etc. In one example, where the primary device 110 is a memory device array including memory devices in a 4×3 array (i.e., 12 memory devices) the display of the wireless mobile device 120 simulates the memory devices in physical order on the display where each position of a memory device on the display shows an icon, name, small video/image frame, etc.

In another embodiment of the invention, as the wireless mobile device 120 is moved from a first proximity space to a second proximity space, the content related to the first proximity space is paused as the content related to the second proximity space starts up. In one example, the first content pauses and the screen is altered so that the second content starts up and is centered. In another example, when the wireless mobile device 120 returns to the first proximity space, the first content resumes and the second content pauses. In still another example, the first content is paused when a specific action is required to be completed. For example, if an action for repairing/removing/installing/etc., a component (e.g., components 130, 132, 134, 140, 142, and 144) has begun, if a particular action is required (e.g., press a button on front of component), the content is correlated to pause until the button is pressed and confirmed. In this example, the component (e.g., components 130, 132, 134, 140, 142, and 144) senses the action is completed and communicates to the wireless mobile device 120 that the action was completed. This communication triggers the resuming of the content on the wireless mobile device 120.

For example, if the primary device is a memory device system, for a first disk drive device, a first proximity space is a one foot radius/distance of a power switch, and a second proximity space is a one foot radius/distance of a network cable. In this example, when the mobile device 120, such as a lap top, is in the proximity of the network cable, the content includes a removal tutorial video, graphical sequence, text, audio, etc. related to, for example, removing the first disk drive device. As the lap top moves within the proximity of the network cable, the content explains/shows that the power switch must be turned off before removing the network cable. In this example, the content will pause on the lap top until the lap top is moved within the proximity of the power switch, and the power switch is turned off. Upon returning the lap top to the proximity of the network cable, the video continues.

In one embodiment of the invention, when multiple content is available for one particular component (e.g., components 130, 132, 134, 140, 142 and 144), a list of content category types are displayed (or played if audio) to reduce the number of available content by filtering based on the category type (e.g., repair, general information, operational use, replacement, maintenance, troubleshoot, etc.). In one example, predetermined queries are displayed (or played if audio) to a user on the wireless mobile device 120 to assist in filtering down the list of content. In one example, the predetermined queries can be based on actions that a user would likely desire to perform (e.g., remove a component? install a component? diagnose a component? identify parts?, etc.).

In one embodiment of the invention, each component (i.e., components 130, 132, 134, 140, 142 and 144) of primary device 110 includes an associated proximity element 131, 133, 135, 141, 143, and 145, respectively. It should be noted that each component can have more than one proximity element depending on the size of the respective component. In one embodiment of the invention, the proximity elements (i.e., proximity elements 131, 133, 135, 141, 143, and 145) provide information associated with the associated component (i.e., components 130, 132, 134, 140, 142 and 144) to the wireless mobile device 120 via a wireless technology, such as Bluetooth®, Radio Frequency Identification (RFID), or other similar technologies upon the wireless mobile device 120 moving into a particular proximity space of a particular component 130, 132, 134, 140, 142 and 144. In one embodiment of the invention, direction information from technologies such as Global Positioning System (GPS), accelerometers, etc., is used to determine direction, heading, change of direction to assist in determining whether the wireless mobile device 120 is leaving/approaching a proximity space of a particular component 130, 132, 134, 140, 142 and 144. In these embodiments of the invention, the direction/heading/change of direction information assists in determining a potential next proximity space of a particular component 130, 132, 134, 140, 142 and 144 as the components can be positioned in an array layout with components horizontally (e.g., front-to-back, side-to-side) located next to one another and also vertically (e.g., up and down) located next to one another. For example, in a device array, such as a memory device array, the memory devices are physically laid out in a 3×3×3 layout with three memory devices positioned side-to-side, top-to-bottom and front-to-back.

In another embodiment of the invention, the components 130, 132, 134, 140, 142 and 144 have assigned priority based on maintenance records/statistics, importance, etc. In one example, the priority adjusts (e.g., expands and/or contracts proximity spaces) the proximity space of the particular component 130, 132, 134, 140, 142 and 144 to assist in providing the particular content most likely needed. In another example, a user of the wireless mobile device 120 has an option of disabling the assigned priority so that the proximity space is not adjusted. In one embodiment of the invention, the priority is based on a maintenance schedule, hierarchy based on an assigned importance to functionality, etc. In another example, the priority is adjusted based on the wireless mobile device 120 and/or a person's role or position. In this example, a user can be assigned a wireless mobile device 120 based on skill level, competence, position, role, etc., so that the proximity space of a component is adjusted to assist the user to retrieve content related to a component that the user is most likely interested in retrieving content for.

In one example as shown in FIG. 1, the wireless mobile device 120 is positioned in a proximity space of component 140. In this example, the proximity element 141 communicates information related to component 140 to the wireless mobile device 120. Based on the received information related to the component 140, the wireless mobile device 120 retrieves content based specifically on the received information related to component 140.

Figure 2:
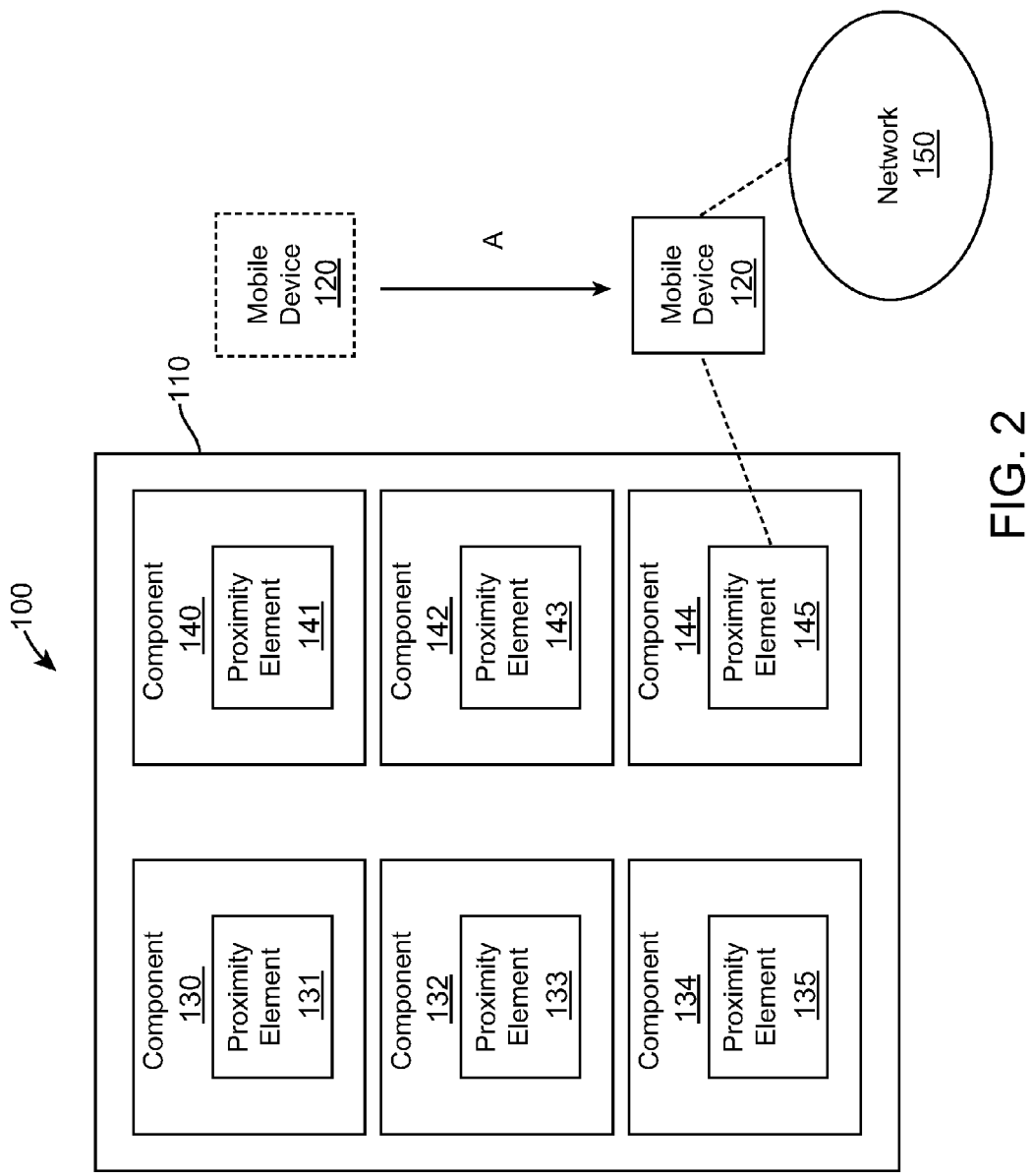
FIG. 2 illustrates the system of FIG. 1 showing a mobile device moving away from a primary device component according to one embodiment of the invention.

FIG. 2 shows an embodiment of the invention where the wireless mobile device 120 is moving away from component 140 in the direction A towards component 145. Upon the wireless mobile device 120 entering a particular proximity space of component 144, the proximity element 145 communicates information related to component 144 to the wireless mobile device 120. Based on the received information related to the component 144, the wireless mobile device 120 retrieves content based specifically on the received information related to component 144.

Figure 3:
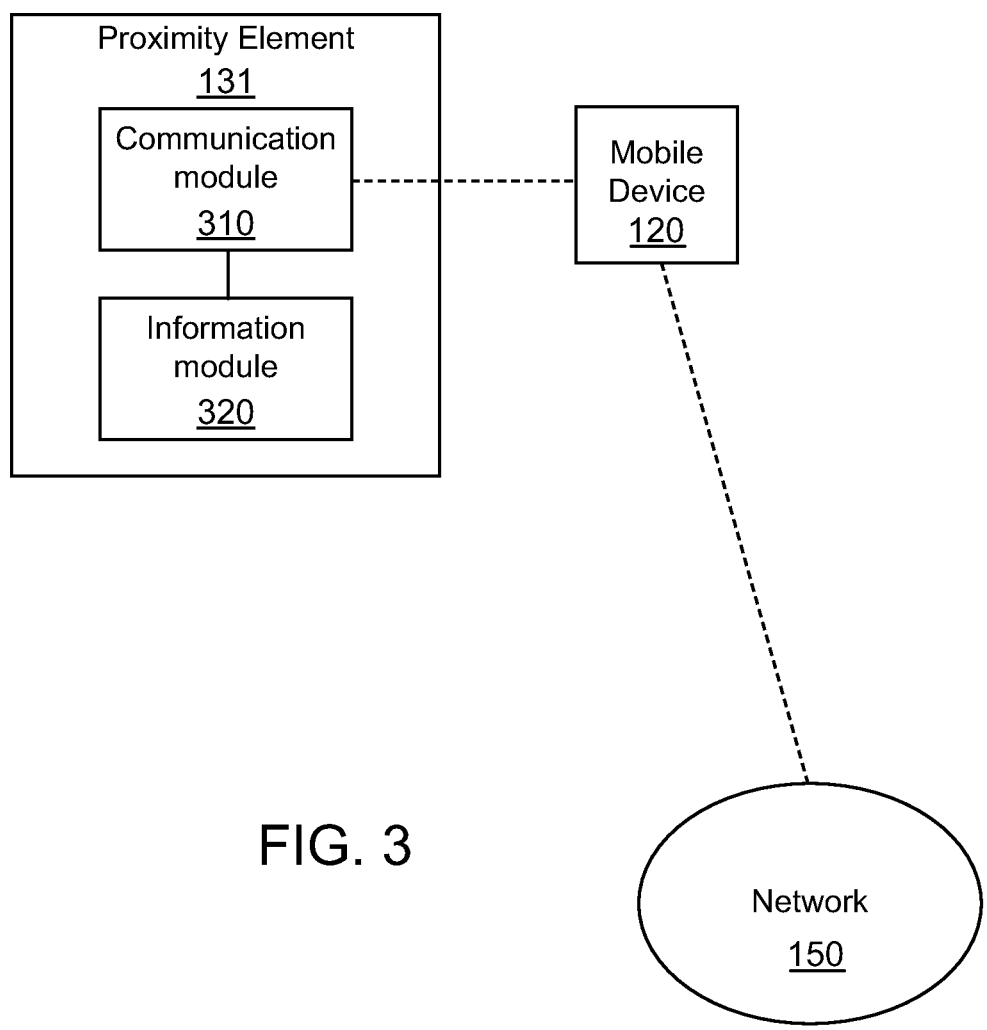
FIG. 3 illustrates a proximity element according to one embodiment of the invention.

FIG. 3 illustrates an example proximity element 131 including a communication module 310 and an information module 320 according to one embodiment of the invention. In this embodiment of the invention the communication module 310 provides wireless communication to the wireless mobile device 120 upon the wireless mobile device 120 being positioned within a particular proximity to the proximity element 131 (i.e., of component 130). In one embodiment of the invention, the proximity space of each proximity element (i.e., proximity elements 131, 133, 135, 141, 143, and 145) of a component (e.g., components 130, 132, 134, 140, 142, and 144) is determined based on the technology used (i.e., Bluetooth®, RFID, etc.), sensitivity of the wireless mobile device 120, etc. In other embodiments, the proximity space is based on other criteria, such as signal strength threshold, interference, etc.

In one embodiment of the invention, the information module 320 includes stored information associated with the particular component (e.g., component 130). In one example the information is stored on a memory device, such as a random access memory (RAM), a read-only memory (ROM), an erasable programmable read-only memory (EPROM or Flash memory), an encoded signal, metadata, etc. In these embodiments of the invention, the information associated with the particular component (e.g., component 130) is communicated to the wireless mobile device 120 via the communication module 310. In one example, the information module includes information such as a specific network address (e.g., Uniform Resource Locator (URL), file path, etc.) for content location, file names associated with content, specific component information (e.g., model/device number, manufacturing date, compatible component relationships, etc.), component statistical information related to the use of the component, maintenance information (e.g., what maintenance has been performed, needs to be performed, etc.), search terms for content that are associated for the particular component, content category type (e.g., repair, general information, operational use, replacement, maintenance, troubleshoot, etc.).

In one embodiment of the invention, the information associated with the particular component (e.g., component 130) is created by a manufacturer and added during a manufacturing process, entered by a technician after manufacturing, entered by device management personnel, updated/entered via a received signal/data, etc.

In one embodiment of the invention, the information associated with the particular component (e.g., component 130) is identified based on a particular slot number of the component (e.g., component 130). In one example, video content is correlated with associated information in a relational table, a database, look up table (LUT), etc. In one embodiment of the invention, the targeted content is determined based on the correlation between the information associated with the particular component (e.g., component 130) and the video content.

Figure 4:
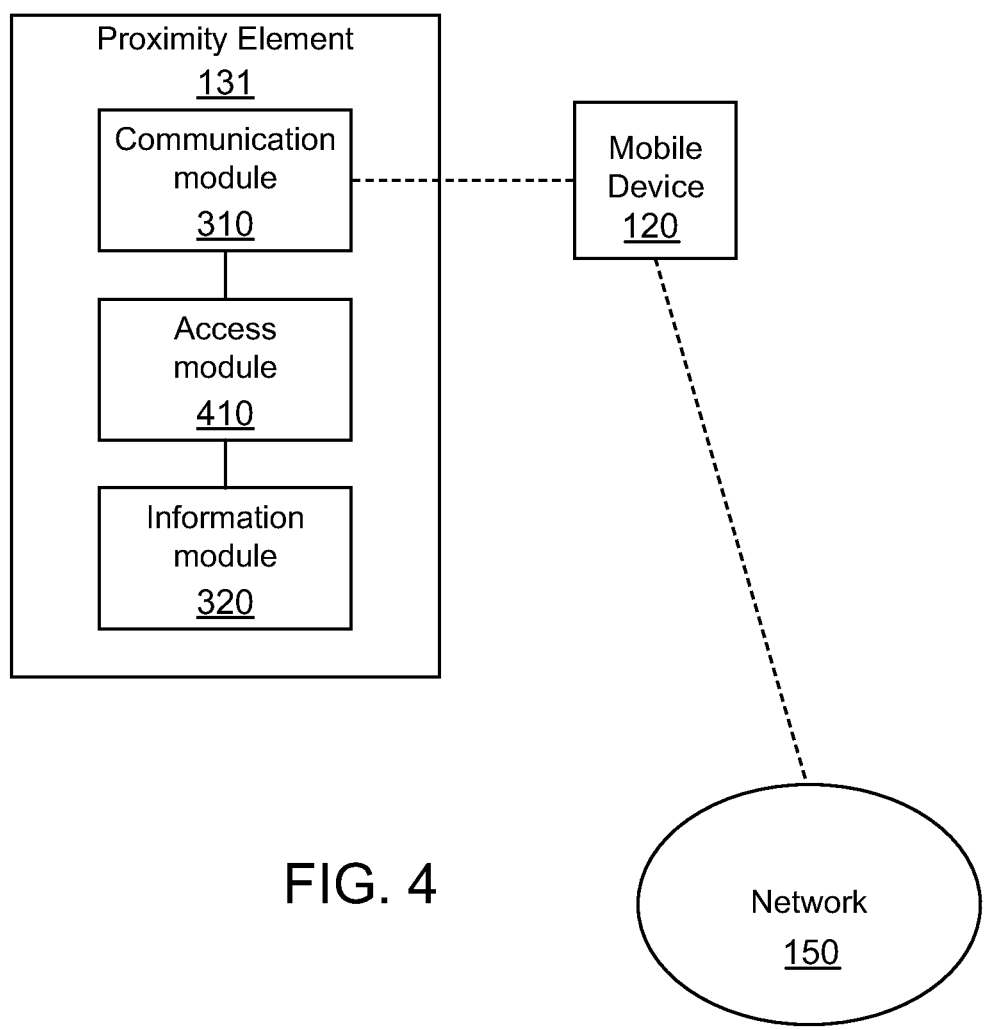
FIG. 4 illustrates another proximity element according to another embodiment of the invention.

FIG. 4 illustrates an embodiment of the invention including a proximity element 131 (e.g., of component 130) that includes a communication module 310, an information module 320 and an access module 410. In this embodiment of the invention, the access module determines whether the wireless mobile device 120 should be granted access or denied access to the information associated with the component (e.g., component 130) stored in the information module 320. In the example of access being denied to a wireless mobile device 120, since no information associated with the component (e.g., component 130) is communicated to the wireless device 120, content is also not retrieved automatically to the wireless mobile device 120. In the case of denied access, in one example a message is communicated to the wireless mobile device 120 indicating access is denied. In these embodiments of the invention, access privilege is assigned by management, based on a person's classification, assigned security clearance, required licensing/certification, etc. and is correlated through a datacenter's systems management software.

In one embodiment of the invention, access is granted/denied by the access module 410 based on particular components (e.g., components 130, 132, 134, 140, 142 and 144). In these embodiments of the invention, different wireless mobile devices 120 can have different access privileges for each component (e.g., components 130, 132, 134, 140, 142 and 144), different access privileges for each primary device (e.g., primary device 110), or any combination of the two.

Figure 5:
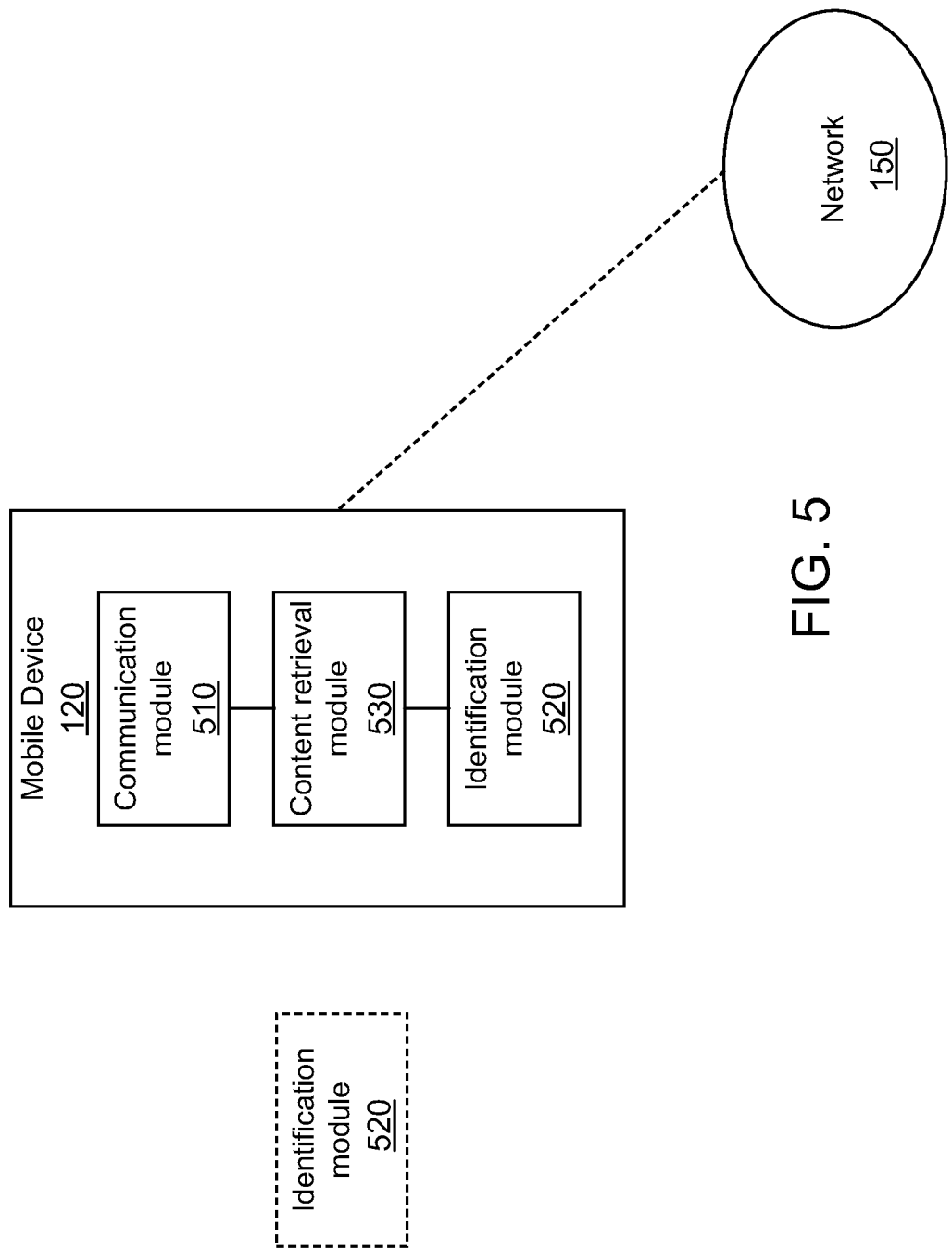
FIG. 5 illustrates a mobile device according to one embodiment of the invention.

FIG. 5 illustrates an embodiment of the invention including wireless mobile device 120 including a communication module 510 and a content retrieval module 530. In one embodiment of the invention, the wireless mobile device 120 includes an optional identification module 520. In other embodiments of the invention, the optional identification module 520 is external to the wireless mobile device 120. In one example, the communication module 510 communicates with the communication module 310 of a proximity element (e.g., proximity element 131) for receiving information associated with a component (e.g., component 130) upon the wireless mobile device entering into a proximity space of the component (e.g., component 130). In one example, the information associated with a component (e.g., component 130) includes identification information, such as name of component, slot position, date installed, part number, maintenance information, install date, etc.

In another example, upon receiving the information associated with a component (e.g., component 130) by the communication module 510, the content retrieval module 530 proceeds to retrieve one or more associated content with the particular component (e.g., component 130). In one example the content comprises streaming video or video file content, graphical content, audio content and text content, in any singular or combination of content types. The content is associated with the particular component (e.g., component 130) by including related information about the component, such as repair information, maintenance information, historical information, statistical information (e.g., error reports, time the component has been used, powered on, years of service, etc.), troubleshooting information, etc. For example, the content retrieved for a disk drive can be a streaming video showing how to replace the disk drive, remove the disk drive, power off the disk drive, replace a cable, etc. In one example, the content retrieval module 530 uses the particular location or path information to perform retrieval of the content. In another example, the content retrieval module 530 uses the received information to perform a network search over network 150.

In one embodiment of the invention, the identification module 520 includes identification information associated with the wireless mobile device 120, such as a user(s) of the wireless mobile device 120, users, etc. In one example, the information associated with the wireless mobile device 120 includes telephone number, an identification code of an element/chip/device (e.g., RFID code, IR code, Bluetooth® code, etc.), a coded signal, etc. In another example, the information associated with a user includes user identification (e.g., name, employee number, badge number, code name, etc.).

In one example, a user logs in with a username and passcode/password to the wireless mobile device 120. Based on the logged in user information, the identification information is communicated to an access module 410 of a proximity element (e.g., proximity element 131) to determine whether the associated component (e.g., component 130) information in the information module 320 is accessible or not. In another example, the identification information in the identification module 520 is only associated with a particular wireless mobile device 120. In this example, no login information is required. In yet another example, the identification information is external to the wireless mobile device 120 in a device, such as an identification module 520 in a badge, a key, an identification card, etc. In this example, based on the identification information contained in the external identification module 520, access to the information associated with the component (e.g., component 130) is granted or denied based on the external identification module 520 independently of the wireless mobile device 120. In this example, access is dependent on the external identification module 520.

In another example, based on the person's role or position, only a subset of content are made available. In this example, a "basic" role or position only provides basic content for display/play while an "administrator" role or position provides all of the basic and all advanced content for display/play. In yet another example, variations based on a person's assigned level of competence determines which content are made available or not. For example, an administrator can have access to repair information, maintenance record information, trouble shooting information, statistical information, historical information, device information (e.g., name, type of device, part number, etc.), etc. While basic content includes maintenance record information and device information, but excludes the repair information, trouble shooting information, statistical information, and historical information. In another example, a person can have a particular security clearance (e.g., top-secret, secret, confidential, etc.). In this example, content is restricted to a user based on their level of clearance. For example, content that is identified as secret is only viewable by users with secret or higher clearance. In one embodiment of the invention, the wireless mobile device 120 is coded to only retrieve content available to a user based on their respective clearance. In one example, a user's login, or other identification information is used to determine the type of content access based on clearance. In another example, a badge or other identification card is used with coded RFID signals to communicate with the wireless mobile device 120 to grant/deny access to content based on clearance.

Figure 6:
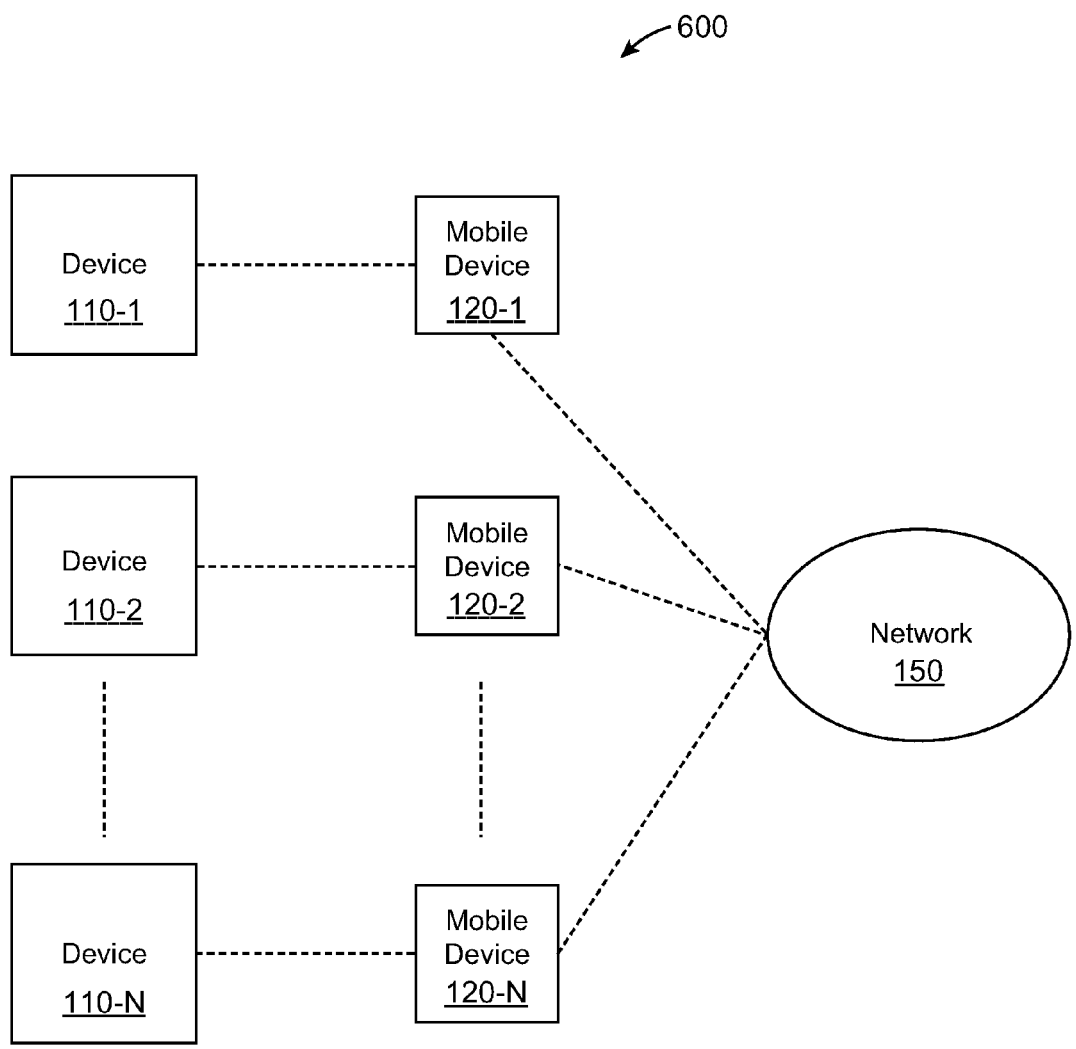
FIG. 6 illustrates a distributed system according to an embodiment of the invention.

FIG. 6 shows a block diagram of example architecture of an embodiment of a distributed component proximity based content retrieval system 600 using proximity of a mobile wireless device 120 in relation to a component (e.g., components 130, 132, 134, 140, 142 and 144) for retrieving particular content. In this embodiment of the invention, the distributed component proximity based content retrieval system 600 includes primary devices 110-1 through 110-N, and wireless mobile devices 120-1 through 120-N, that may be distributed, in any combination in a network of any of the following: a local area network (LAN), WLAN, Internet, local network, home network, private network, etc., or any combination of network types, and connect to a wireless network 150. In this embodiment of the invention, the primary devices 110-1 through 110-N and wireless devices 120-1 through 120-N performs similar functions as with the component proximity based content retrieval system 100 and other described embodiments of the invention. In one example, multiple mobile wireless devices 120 (e.g., computer tablets/pads) are carried by users throughout a data center, which may be housed in a 5,000-20,000 square feet area. Upon a user needing to perform an action, such as repair a component, for example, a server fan, as the user moves the mobile wireless device 120 into the proximity range of the server fan, a video tutorial on replacing the server fan is played on the wireless mobile device 120. At the same time, other users are moving about the data center and doing similar functions for other assignments (e.g., repair of servers, maintenance of servers, retrieving statistical information of different devices, etc.).

In another example, multiple mobile wireless devices 120 (e.g., cell phones) are carried by users throughout a video machine/game arcade. In this example, each video machine is a primary device in the arcade and includes multiple components, such as joy sticks, buttons, triggers, pedals, etc. In this example, as a user carrying a wireless mobile device 120 approaches a proximity space of a video machine, content including a video showing information about the video machine is played on the wireless mobile device 120, In this example, the content includes general information, a tutorial on how to use/play the video arcade/game machine, etc. As the user moves the wireless mobile device 120 in the proximity space of another component, such as a joy stick, buttons, etc., content including a tutorial on how to use the component(s) is played on the wireless mobile device 120.

In one embodiment of the invention where the distributed component proximity based content retrieval system 600 uses the Internet, the network represents a worldwide collection of networks and gateways that use the Transmission Control Protocol/Internet Protocol (TCP/IP) suite of protocols to communicate with one another. Included as central to the Internet is a backbone of high-speed data communication lines between major nodes or host computers, comprising a multitude (e.g., thousands, tens of thousands, etc.) of commercial, governmental, educational and other computer systems that route data and messages.

Figure 7:
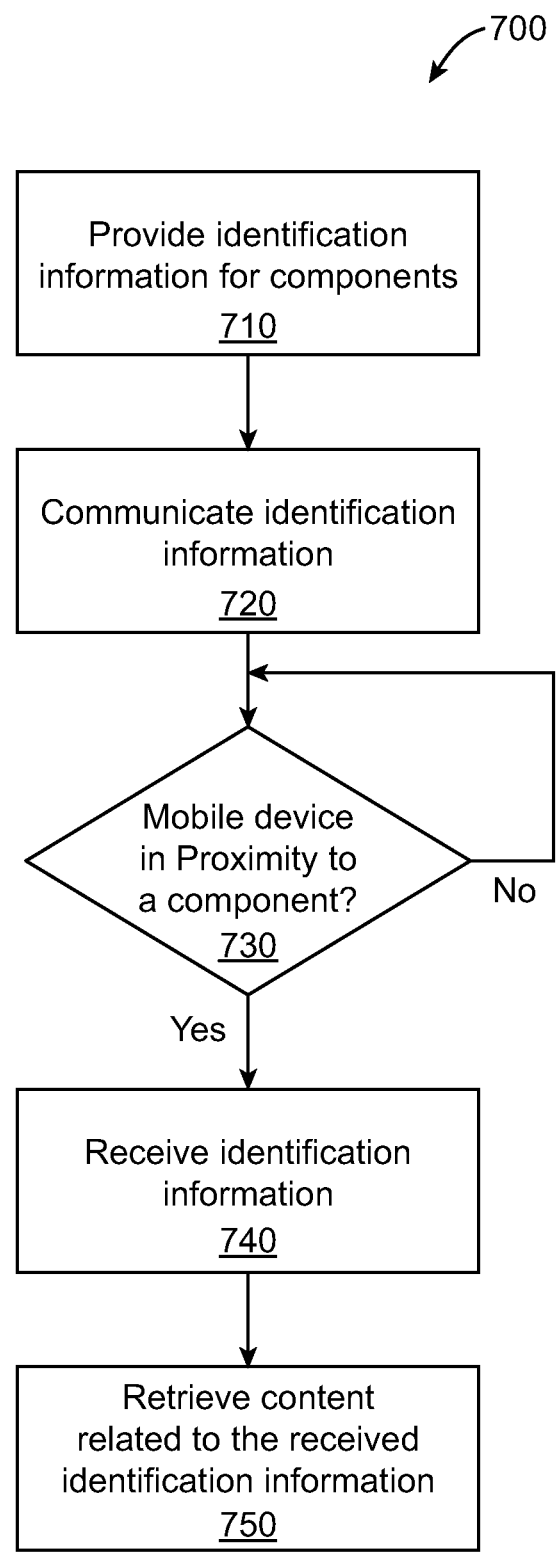
FIG. 7 illustrates a block diagram of a process according to an embodiment of the invention.

FIG. 7 illustrates a block diagram of an example process 700 for proximity based retrieval of content, according to an embodiment of the invention. In one or more embodiments of the invention, the details of the process 700 are similar in functionality with respect to one or more embodiments of the component proximity based content retrieval system 100 and the distributed component proximity based content retrieval system 600, in particular to the functionality of the components (e.g., components 130, 132, 134, 140, 142 and 144) and the wireless mobile device 120 employed in the component proximity based content retrieval system 100 and the distributed component proximity based content retrieval system 600.

According to the process 700, block 710 provides identification information for components (e.g., components 130, 132, 134, 140, 142 and 144). In one example, the information is provided to the information module 320 of component proximity based content retrieval system 100.

Block 720 communicates the identification information from proximity elements (e.g., proximity elements, 131, 133, 135, 141, 143 and 145) according to one embodiment of the invention. In one example, the identification information from the proximity elements (e.g., proximity elements, 131, 133, 135, 141, 143 and 145) is continuously communicated. In another example, the identification information from the proximity elements (e.g., proximity elements, 131, 133, 135, 141, 143 and 145) is only communicated based on access by access module 410.

In block 730 it is determined whether a wireless mobile device 120 is within a proximity space of a proximity element (e.g., proximity elements 131, 133, 135, 141, 143, and 145) of a component (e.g., components 130, 132, 134, 140, 142 and 144). If it is determined that the wireless mobile device 120 is not within a proximity space of a component (e.g., components 130, 132, 134, 140, 142 and 144), the process 700 continues with block 730. Otherwise, process 700 continues with block 740 where information associated with a component (e.g., components 130, 132, 134, 140, 142 and 144) is communicated from a communication module 310 of a component (e.g., components 130, 132, 134, 140, 142 and 144) to a communication module 510 of a wireless mobile device 120.

Block 750 performs retrieval of content related to the received identification information based on the proximity of the wireless mobile device 120 to the particular component (e.g., components 130, 132, 134, 140, 142 and 144) of a device 110.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart illustrated in FIG. 7 and block diagrams in FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I/O devices (including but not limited to keyboards, displays, pointing devices, resistive digitizers (i.e., touch screens), etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
   a primary device including a plurality of replaceable electronic components within the primary device, each of the electronic components having a proximity element and associated proximity space; and
   a mobile device that receives identification information from a particular electronic component among the plurality of electronic components and retrieves content related to the particular electronic component based on the received identification information while the mobile device is positioned within the associated proximity space of the particular electronic component, wherein the content comprises maintenance information and replacement instructions;
   wherein the mobile device provides content based on proximity to a particular electronic component within the primary device, the electronic components have assigned priorities, and the associated proximity space expands or contracts based on the assigned priority, wherein assigned priority is based on one or more of maintenance information, component importance and user skill level.

2. The system of claim 1, wherein the mobile device performs a search for content based on the received identification information on a network.

3. The system of claim 1, wherein the mobile device retrieves content from a particular location on a network based on the received identification information.

4. The system of claim 1, wherein the mobile device displays a list of content based on the received identification information.

5. The system of claim 4, wherein the list of content retrieved is reduced based on providing content category type selections and filtering based on category type.

6. The system of claim 1, wherein the proximity element communicates with the mobile device via a wireless signal.

7. The system of claim 6, wherein the proximity element transmits the identification information based on assigned user access privilege information, wherein retrieved content is filtered based on the assigned user access privilege information.

8. The system of claim 1, wherein content comprises one or more of video content, graphic content, audio content and text content, and the content includes one or more of operational use information, troubleshoot information, and error reports.

9. A method comprising:
   providing a proximity element for each of a plurality of replaceable electronic components within an associated primary device, wherein each electronic component is associated with a proximity space;
   communicating identification information of each proximity element for an associated particular proximity space;
   upon a mobile wireless device being located within the associated particular proximity space of a particular proximity element:
   receiving associated identification information of the particular proximity element;
   retrieving content based on the associated identification information, wherein the content comprises maintenance information and replacement instructions for a particular replaceable electronic component associated with the particular proximity element; and
   providing content on the mobile wireless device based on proximity to a particular electronic component within the primary device, wherein the electronic components have assigned priorities, and the associated proximity space expands or contracts based on the assigned priority, wherein assigned priority is based on one or more of maintenance information, component importance and user skill level.

10. The method of claim 9, further comprising:
    performing a search for content on a network based on the associated identification information, wherein the content comprises one or more of operational use information, troubleshoot information, and error reports.

11. The method of claim 10, further comprising:
retrieving content from a particular location based on the associated identification information,
wherein the primary device comprises a single physical device including the plurality of electronic components that are each associated with a separate proximity space.

12. The method of claim 9, further comprising:
selecting a predetermined content type category; and
retrieving content from the selected content type category based on the associated identification information.

13. The method of claim 9, further comprising:
receiving assigned user access identification information; and
communicating the assigned identification information of each proximity element based on the assigned user access identification information, wherein retrieved content is filtered based on the assigned user access information.

14. The method of claim 9, wherein providing of the content is paused upon the mobile device moving outside of the associated particular proximity space of the particular electronic component.

15. The method of claim 14, wherein providing the content resumes upon the mobile device moving back to the associated particular proximity space of the particular electronic component.

16. The method of claim 9, wherein content comprises one or more of video content, graphic content, audio content and text content.

17. A computer program product for proximity based video content retrieval comprising:
a non-transitory computer usable medium having computer readable program code embodied therewith, the computer readable program code comprising:
computer readable program code configured for:
receiving identification information from a plurality of proximity elements within a primary device component based on a particular associated proximity space associated with each proximity element, wherein each of the plurality of proximity elements is associated with an electronic component of the primary device;
upon a mobile wireless device being located within the associated particular proximity space of a particular proximity element:
receiving associated identification information from the particular proximity element;
retrieving content based on the associated identification information; and
providing the content on the wireless mobile device, wherein the content comprises maintenance information and replacement instructions for a particular electronic component associated with the particular proximity element
wherein the wireless mobile device provides content based on proximity to a particular electronic component within the primary device, the electronic components have assigned priorities, and the associated proximity space expands or contracts based on the assigned priority, wherein assigned priority is based on one or more of maintenance information, component importance and user skill level.

18. The computer program product of claim 17, wherein the computer is further caused to:
perform a search for content on a network based on the associated identification information.

19. The computer program product of claim 17, wherein the computer is further caused to:
receive assigned user access identification information; and
communicate the assigned identification information of a proximity element based on the assigned user access identification information, wherein content provided is filtered based on assigned user access information.

20. The computer program product of claim 19, wherein proximity is one of hierarchical proximity based on assigned importance to functionality and navigational proximity.

21. The computer program product of claim 19, wherein content comprises one or more of video content, graphic content, audio content and text content, and the content includes one or more of operational use information, troubleshoot information, and error reports.

22. The computer program product of claim 17, wherein providing the content is paused upon the mobile device moving outside of the particular proximity space of the proximity element within the primary device, and content related to another proximity element is provided upon the mobile device moving inside a particular proximity space of the other proximity element within the primary device.

23. The computer program product of claim 22, wherein providing the content resumes upon the mobile device moving back to the particular proximity space of the proximity element.

* * * * *